April 25, 1961 J. M. WIER 2,981,851

CONSTANT OUTPUT IMPEDANCE NETWORK

Filed Dec. 6, 1957

INVENTOR
J. M. WIER
BY [signature]

ATTORNEY 2,981,851
Patented Apr. 25, 1961

2,981,851

CONSTANT OUTPUT IMPEDANCE NETWORK

Joseph M. Wier, Scotch Plains, N.J., assignor to Bell Telephone Laboratories, Incorporated, New York, N.Y., a corporation of New York Filed Dec. 6, 1957, Ser. No. 701,225
15 Claims. (Cl. 307—88.5)

Figure 1:
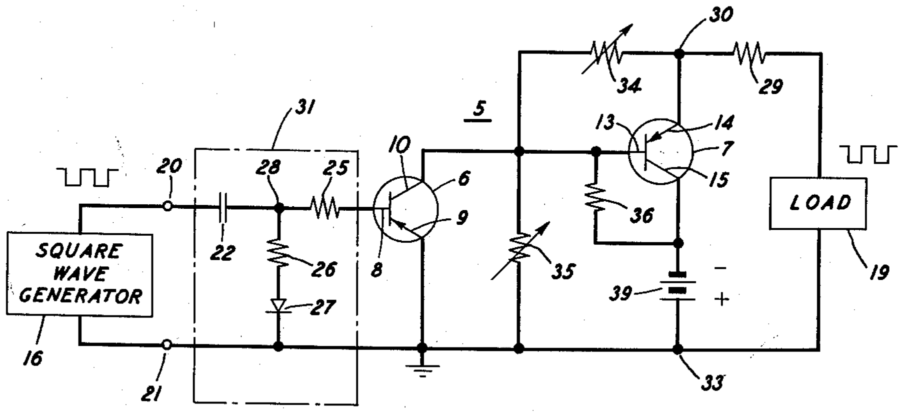

This invention relates to a transistor coupling circuit having a substantially constant output impedance. More specifically, the invention relates to such circuit for coupling a square wave generator having a variable output impedance to a load having a substantially constant input impedance.

In certain high speed data transmission systems it is necessary to couple a source of driving signals to the system at a point which is extremely sensitive to changes in the output impedance of the driving source. For example, the source of driving signals may be coupled to the input of a filter network having a predetermined characteristic input impedance. If the output impedance of the driving source does not approximately match the characteristic input impedance of the filter network, the coupling may cause reflections which would tend to impair the efficiency and fidelity of the operation of the transmission system.

The output impedances of many driving signals sources, such as multivibrator circuits, vary widely during their operation. In some networks employing vacuum tubes for coupling the driving signal sources to load circuits, cathode follower circuits are used if it is necessary to provide substantially constant output impedance for such sources; but the cathode follower vacuum tube must conduct continuously within its linear operating range to provide the constant output impedance. The transistorized equivalent of the vacuum tube cathode follower circuit would be an emitter follower circuit, which has certain output impedance variation problems in common with the cathode follower. Thus, in terms of a transistor circuit, the emitter load impedance only is connected between the circuit output terminals when the transistor is Off; and the load impedance is shunted by the combined internal resistances of the transistor emitter-collector circuit and of the operating potential source when the transistor is On. It is therefore obvious that the output impedance of the emitter follower circuit exhibits substantial output impedance variations when driven between its conducting and non-conducting conditions. Similar impedance variations are encountered when a cathode follower tube is driven between its conducting and nonconducting conditions.

The present invention contemplates an On/Off transistor circuit with a substantially constant output impedance, which circuit is responsive to signal pulses from a generating source of variable output impedance for coupling the source to an electrical load network of approximately constant impedance to minimize reflection.

It is one object of this invention to improve the technique for coupling two electric circuits of different impedances.

It is another object to minimize reflection in a signaling transmission system.

It is another object to provide improved impedance translation in a signaling transmission system.

It is another object to improve the impedance match between components of different impedances in a signaling transmission system.

It is still another object to minimize power loss in a signaling transmission system.

It is another object to couple a signal generating source of varying output impedance to a load circuit having a constant input impedance with substantially minimum reflection.

Another object is to utilize an improved transistor coupling network of substantially constant output impedance for approximately matching the variable output impedance of a signal source to the constant input impedance of a load circuit.

It is an additional object to provide an On/Off coupling circuit with substantially constant output impedance for driving an electric network with minimum reflection.

It is a further object to test a high speed data transmission system by supplying thereto, at substantially constant impedance, signal pulses of variable frequency and duration and measuring changes in the pulse duration incurred during transmission, as an index of the fidelity of the system for data transmission.

These and other objects of this invention may be carried out in an illustrative embodiment thereof in which two transistors are connected in an On/Off trigger circuit wherein the transistors conduct alternately. The load which is driven through the On/Off circuit is connectable in a conductive loop with the internal collector-emitter impedance of each transistor when that transistor is conducting. The output of a source of rectangular driving pulses is connected between the base and emitter electrodes of a first transistor to drive the first transistor between a saturated conducting condition and a nonconducting condition. The load is connectable between the first transistor emitter and collector electrodes via a variable resistor, and between the emitter and collector electrodes of the second transistor via a source of operating potential connected to both transistors. The variable resistor is also connected between the second transistor base and emitter electrodes so that the potential difference across the resistor drives the second transistor between a conducting condition and a nonconducting condition in response to the nonconducting and saturated conducting conditions, respectively, of the first transistor.

The On/Off circuit is On insofar as the load is concerned when the second transistor is On and the potential of the operating source is driving the current thereof through the load and the second transistor. The On/Off circuit is Off insofar as the load is concerned when the the second transistor is Off and the load is shunted by the first transistor. Hence, no current from the operating potential source is driven through the load circuit. In either the On or the Off condition, however, the output impedance of the On/Off coupling circuit presented to the load is substantially the same as will be hereinafter described.

In one application of the aforesaid embodiment of the invention, the output of varying impedance of a source of driving pulses of predetermined time-duration is connected to the sending end of a high speed data transmission system via the On/Off coupling circuit which has a constant output impedance. The pulses at the receiving end of the system are applied to a time bias detector circuit wherein changes introduced into pulse time-durations during transmission are detected to provide an indication of the fidelity of the system for transmitting data information.

Figure 2:
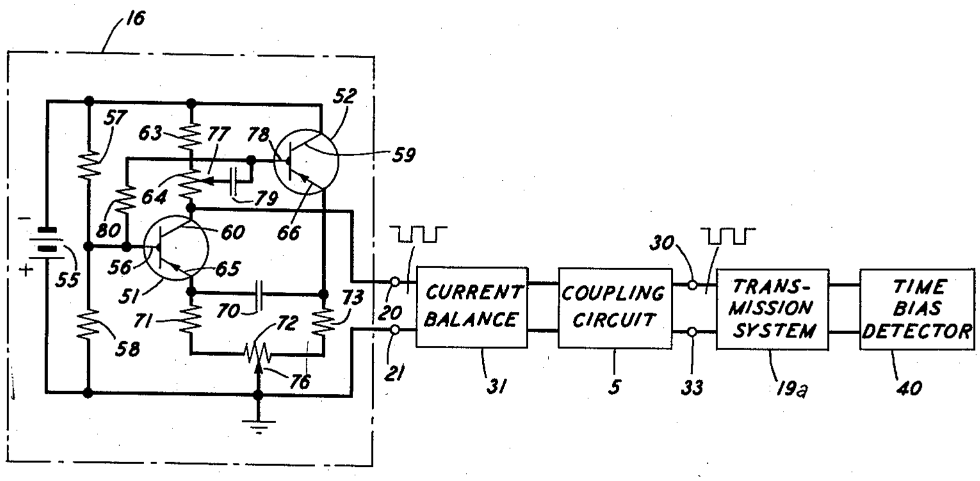

The novel features which are believed to be characteristic of the invention both as to its organization and method of operation, together with further objects and advantages thereof, will be better understood from the following description considered in connection with the drawing in which:

Fig. 1 is a schematic diagram of an illustrative embodiment of the invention, and Fig. 2 is a diagram, partly in schematic form and partly in block and line form, of a testing system embodying the invention shown in Fig. 1.

Referring to Fig. 1, two p-n-p junction transistors 6 and 7 comprise the active elements of a coupling, or On/Off, circuit 5 in accordance with the invention. Transistor 6 is provided with a base electrode 8, an emitter electrode 9, and a collector electrode 10. Similarly, transistor 7 is provided with a base electrode 13, an emitter electrode 14, and a collector electrode 15. Transistors 6 and 7 are characterized, as is well known in the art, by having between the collector and emitter electrodes thereof a low impedance of the order of 5 ohms when biased in a saturated conducting condition, a high impedance of the order of 1 megohm when biased beyond cut-off, and a variable intermediate impedance when biased for conduction at less than the saturation level.

A suitable source of driving signals, such as the square wave generator 16, may be employed to drive a load 19 via coupling circuit 5. Generator 16 may, for example, be a multivibrator such as that shown in Fig. 2 herein and disclosed in my copending application Serial No. 701,222, filed December 6, 1957, entitled "Transistor Multivibrator Frequency Control," and assigned to the same assignee as the present invention. The output of generator 16 is connected to terminals 20 and 21 for applying thereto a wave which, for example, may be a train of alternate positive-going and negative-going pulses forming a square wave which is entirely negative with respect to ground as might be the case if generator 16 were a multivibrator. Terminal 21 is connected directly to ground and to emitter electrode 9. Terminal 20 is coupled to base electrode 8 via a series connection of coupling capacitor 22 and a current limiting resistor 25 which comprise the horizontal leg of a T-network constituting a current balance circuit 31. The square wave pulses from generator 16 which are applied between base electrode 8 and emitter electrode 9 are of sufficient amplitude to bias transistor 6 alternately between a saturated conducting condition and a nonconducting condition.

A resistor 26 and a diode 27 comprise the vertical leg of the aforementioned T-network and are connected in series between ground and a common terminal 28 for capacitor 22 and resistor 25. Resistor 26 and diode 27 provide a discharge path for capacitor 22 during output pulses from generator 16 which are positive-going with respect to ground. Diode 27, which is poled for conduction toward ground, prevents resistor 26 from shunting the input circuit of transistor 6 during negative-going pulses from generator 16. Resistor 25 limits the current flowing in the internal emitter-base path of transistor 6, when transistor 6 is conducting, to prevent excessive charge from accumulating on capacitor 22 during such conduction intervals and to reduce the base current in transistor 6 to a value which is safe from the standpoint of possible injury thereto. Current balance circuit 31 blocks the direct current component of the positive-going and negative-going output pulses of generator 16 and causes the alternating current component thereof to be applied between base electrode 8 and emitter electrode 9 as positive and negative pulses, respectively, with approximately equal amplitude excursions and equal time-durations as will be hereinafter discussed in greater detail.

Output terminal 33 is connected directly to ground and to emitter electrode 9. A variable resistor 34 is connected between output terminal 30 and collector electrode 10 for a purpose that will presently appear. A variable resistor 35 is connected between collector electrode 10 and emitter electrode 9 for adjusting the voltage level of the output signals coupled to terminals 30 and 33 in a manner that will be hereinafter described in greater detail. Collector electrode 10 is also connected directly to base electrode 13. A resistor 36 is connected between base electrode 13 and collector electrode 15. Resistors 35 and 36 are also connected in series between the terminals of battery 39 to form a potential divider for fixing the operating potential level of collector electrode 10 and base electrode 13. The positive terminal of battery 39 is grounded and the negative terminal thereof is directly connected to collector electrode 15.

Coupling circuit 5 drives load 19, which may comprise a transmission system or the like, and a resistor 29 connected in series between output terminals 30 and 33. Coupling circuit 5 produces a square wave voltage under control of generator 16 and provides a substantially constant impedance at its output terminals 30 and 33 in a manner and for a purpose that will presently appear. Resistor 29 may or may not be employed for the reaons given below. In the instance where the output impedance of coupling circuit 5 is substantially equal to the input impedance of load 19, resistor 29 is usually not required. In the instance, however, where the output impedance of coupling circuit 5 is, for example, 200 ohms whereas the input impedance of load 19 is, for example, 2000 ohms, resistor 29 of appropriate magnitude may be used to advantage for building out the output impedance of the coupling circuit to a value comparable to the input impedance of load 19. Another instance where resistor 29 may be used to advantage will be hereinafter described.

Considering now the operation of the invention and assuming transistor 6 to be biased to the Off condition and transistor 7 to be in the On condition for supplying current from battery 39 to load 19, a negative-going pulse from generator 16 is applied between base electrode 8 and emitter electrode 9, via the current balance circuit 31, as a pulse which is negative with respect to ground. This negative pulse blocks diode 27 and biases transistor 6 into saturated conduction. Coupling capacitor 22 charges via a circuit including square wave generator 16, ground, emitter electrode 9, base electrode 8, and resistor 25 so that its right-hand plate is positive with respect to its left-hand plate. The conduction of transistor 6 causes the internal impedance between its emitter electrode 9 and collector electrode 10 to drop to a very low level, compared to such internal impedance when transistor 6 is nonconducting, so that base electrode 13 of transistor 7 is in effect clamped therethrough to ground potential.

If load 19 includes no active potential source or resonant combination of impedances that could drive terminal 30 positive with respect to ground when transistor 6 is On then emitter electrode 14 must be at a potential which is equal to or more negative than ground; and transistor 7 is biased Off. With transistor 7 Off and transistor 6 On, the output impedance of coupling circuit 5 is assumed to be substantially equal to the input impedance of load 19 connected to output terminals 30 and 33 and comprises in series the resistance of resistor 34 and the low internal impedance of transistor 6 between its collector electrode 10 and emitter electrode 9. As a consequence, substantially no current from battery 39 will flow in resistor 34 since the low saturated conducting impedance between emitter electrode 9 and collector electrode 10 comprises a very low impedance shunt around resistors 29 and 34 and load 19 insofar as current flow from battery 39 is concerned. Thus, substantially all the current from battery 39 will flow in the low-impedance series loop circuit including battery 39, emitter 9 and collector 10 of transistor 6, and resistor 36. Very little, if any, current from battery 39 will flow in the relatively high-impedance series loop circuit comprising battery 39, resistors 36, 34, and 29, and load 19. In this instance, load 19 is obviously not driven by coupling circuit 5.

Following the negative-going pulse hereinbefore mentioned, a positive-going pulse from generator 16 is applied between base electrode 8 and emitter electrode 9 via current balance circuit 31 as a pulse which is positive with respect to ground. This pulse biases base electrode 8 more positive than emitter electrode 9 and thus biases transistor 6 beyond cut-off. In addition, the positive pulse acts in series-aiding relation with the charge which was stored on capacitor 22 during the preceding negative-going pulse to bias diode 27 into conduction. Capacitor 22 discharges via resistor 26, diode 27, and square wave generator 16 until the potential on the right-hand plate of the capacitor falls to ground potential or until the positive-going pulse is terminated, whichever occurs first, thereby biasing diode 27 Off.

When transistor 6 is biased beyond cut-off, the voltage of battery 39 drives a current through a series circuit including load 19, resistor 29, resistor 34, and resistor 36. This current causes a potential difference to appear across resistor 34 which serves to bias emitter electrode 14 more positive than base electrode 13 thereby triggering transistor 7 into conduction. Now, the current of battery 39 will flow in a series circuit comprising battery 39, load 19, resistor 29, and the emitter electrode 14 and collector electrode 15 of transistor 7 in conduction. With transistor 7 On and transistor 6 Off the output impedance of coupling circuit 5 connected to output terminals 30 and 33 is assumed to be approximately equal to the input impedance of load 19 and comprises the internal impedance of transistor 7 between its emitter electrode 14 and its collector electrode 15 in series with the internal resistance of battery 39. Upon the application of another negative pulse to base electrode 8, transistor 6 is biased On once more and transistor 7 is again biased Off, in the manner hereinbefore described, to repeat the foregoing operation.

It will be noted that transistor 7 is connected, and operates, somewhat in the manner of an emitter follower circuit. Input signals are applied between base electrode 13 and emitter electrode 14 in the form of the potential difference appearing across resistor 34 and serving to bias transistor 7 On as above mentioned whereas the absence of such potential enables transistor 7 to return to the Off condition. Output signals in the form of current flow or no current flow from battery 39 are derived from a circuit connected between emitter electrode 14 and ground and including load 19, and in some instances resistor 29 as previously mentioned. When transistor 7 is Off and transistor 6 is On, no potential from battery 39 is applied to the circuit which includes load 19; and as a consequence, no current from battery 39 is caused to flow in the load. Hence, no signal pulse is applied to load 19. On the other hand, when transistor 7 is On and transistor 6 Off, a potential from battery 39 is applied to load 19 to cause a current from this battery to flow in load 19. As a consequence, a signal pulse is applied to load 19.

Level control resistor 35 may be adjusted to change the total combined resistance of resistors 35 and 36 between the terminals of battery 39 and thus change the bias potential level with respect to ground required for base electrode 13 when transistor 6 is Off with transistor 7 On. The change in the bias level of base electrode 13 of transistor 7, which is not in saturated conduction, changes the internal impedance between emitter electrode 14 and collector electrode 15 as is well known in the art. The latter change in impedance also changes the total current flowing from battery 39 to load 19 via transistor 7 and thus changes the amplitude of signal pulses applied thereto.

As has been hereinbefore noted, the impedance between terminals 30 and 33 comprises: (1) when transistor 6 is On in saturated conduction and transistor 7 is Off, the resistance of resistor 34 in series with the internal impedance of transistor 6 between emitter electrode 9 and collector electrode 10; and (2) when transistor 7 is On in nonsaturated conduction and transistor 6 is Off, the internal impedance of transistor 7 between emitter electrode 14 and collector electrode 15 in series with the internal resistance of battery 39. It has been found that the output impedance of coupling circuit 5 across its terminals 30 and 33 may vary slightly between the aforenoted conditions (1) and (2).

In order to make the output impedance of coupling circuit 5 substantially the same at its output terminals 30 and 33 for the respective conditions of either transistor 6 On or transistor 7 On, the resistance of resistor 34 plus the low resistance of transistor 6 in saturation for above-noted condition (1) is made equal to the internal resistance of battery 39 plus the internal impedance of transistor 7 in nonsaturated conduction for above-noted condition (2) at a predetermined intermediate output level as controlled by resistor 35. It has been found that the low resistance of transistor 6 can generally be neglected since it is usually quite small compared to the conducting resistance of transistor 7 or the resistance of battery 39. Thus the resistance of resistor 34 is made substantially equal to the internal resistance of battery 39 plus the internal impedance of transistor 7 in nonsaturated conduction. An adjustment of resistor 35 changes the internal collector-emitter impedance of transistor 7 as previously explained thereby tending to establish the impedance equality between terminals 30 and 33 with transistors 6 and 7 conducting, respectively. However, any further unbalance of such impedance relationship can be corrected by a compensating adjustment of resistor 34 or by making the resistor 29 of such large magnitude that the small changes in output impedance of coupling circuit 5 due to bias level changes for transistor 7 within the range of resistor 35 are negligible.

From the foregoing operation of Fig. 1, it is apparent that coupling circuit 5 controlled by the square wave pulses supplied thereto by generator 16 produces further square wave alternating pulses which drive load 19. Since the impedance at output terminals 20 and 21 of generator 16 varies, the coupling circuit 5 translates such varying output impedance into a substantially constant output impedance at the output terminals 30 and 33 thereof. The latter output impedance matches approximately the input impedance of load 19 thereby enabling coupling circuit 5 to repeat the square wave pulses of generator 16 into load 19 with substantially (1) maximum power, (2) uniform time-duration, and (3) minimum reflection.

Summarizing, the coupling circuit 5 may be briefly characterized as two electronic switch circuits connected in parallel between the input terminals 30 and 33 of a load circuit. Each switch circuit includes in series therein the internal collector-emitter circuit of one transistor. The switch-closed impedances of the two switch circuits are substantially equal to one another and the switch-closed impedance of each switch circuit is substantially equal to the input impedance of the load circuit.

Referring to Fig. 2, there is illustrated a testing apparatus embodying the invention of Fig. 1. An On/Off circuit for supplying test signals includes coupling circuit 5 and further includes, as the square wave generator 16, a free running multivibrator circuit in accordance with my above-mentioned copending application. The On/Off circuit is employed to drive a transmission system 19*a* and time bias detector 40 in the manner hereinbefore described in connection with Fig. 1 with regard to driving load 19. System 19*a* is a high speed data transmission circuit which is tested by applying to the sending end thereof alternating waves of a predetermined time symmetry condition and detecting at the receiving end any differences in such symmetry condition.

The multivibrator circuit functions to produce pulses at terminals 20 and 21 in the form of a substantially square output wave of variable frequency and variable time symmetry. The variable symmetry feature permits adjustment of pulse duration so that the generator output is a rectangular wave rather than a square wave. Both the frequency and the symmetry of the multivibrator output wave are separately adjustable within limited ranges by separate controls, and individual changes in the frequency and the symmetry have only a very limited secondary effect on each other.

The multivibrator circuit comprises transistors 51 and 52 having the electrodes thereof connected in an emitter coupled circuit. A battery 55 supplies operating potential to base electrode 56 of transistor 51 via a potential divider comprising resistors 57 and 58. A collector electrode 59 of transistor 52 is connected directly to the negative terminal of battery 55, and the collector electrode 60 of transistor 51 is also connected to the negative terminal of battery 55 via the series connected resistors 63 and 64. The emitter electrodes 65 and 66 are connected to the grounded positive terminal of battery 55 by a resistance-capacitance network which comprises a commutating capacitor 70 connected between emitter electrodes 65 and 66 and resistors 71, 72, and 73 connected in series in the order named between emitter electrodes 65 and 66 but in parallel with the capacitor 70. An adjustable tap 76 provided on resistor 72 connects mutually inversely variable portions of the total resistance of resistors 71, 72, and 73 between ground and emitter electrodes 65 and 66 to change the time symmetry of the multivibrator output wave.

An adjustable tap 77 provided on resistor 64 is connected to base electrode 78 via a coupling capacitor 79. Adjustments of tap 77 change the portion of the total potential drop across resistors 63 and 64 which is applied to base electrode 78 when transistor 51 is conducting. Accordingly, the potential to which commutating capacitor 70 must charge to bias transistor 52 into conduction is changed thereby altering the conduction time of transistor 51. Since the charge accumulated on capacitor 70 to bias transistor 52 into conduction is changed, the amount by which this charge must be altered when transistor 52 is conducting, in order to bias transistor 51 into conduction once more, is also changed. As noted in my above-mentioned copending application, an adjustment of tap 77 which reduces the conducting time for transistor 51 also reduces the conducting time of transistor 52 and thus increases the frequency of the output wave coupled to terminals 20 and 21. In like manner an adjustment of tap 77 which increases the conducting time for transistor 51 also increases the conducting time for transistor 52 and decreases the frequency of the output wave.

A resistor 80 is connected between base electrodes 56 and 78. Capacitor 79 and resistor 80 co-operate to increase the degree of independence between frequency changes by means of tap 77 and symmetry changes by means of tap 76 with respect to one another. The time constant of resistor 80 and capacitor 79 is large with respect to the period of the multivibrator output wave, the repetition interval of the generated pulses.

As pointed out above and explained in further detail in my above-identified copending application, the impedance of the afore-noted generator 16 at its output terminals 20 and 21 may vary depending upon the conduction of the respective transistors 51 and 52 at a given time during the generation of the square wave voltage. The output of generator 16 is connected through current balance circuit 31 and coupling circuit 5 to the input of transmission system **19*a* under test. System 19*a* is terminated in a time-bias detector 40. Thus, coupling circuit 5 translates the different impedances between multivibrator output terminals 20 and 21 into a substantially constant impedance at the coupling circuit output terminals 30 and 33, and the latter output impedance is approximately matched to the input impedance of transmission system 19*a*** in the manner above explained in regard to Fig. 1.

In the operation of Fig. 2, coupling circuit 5 produces a square wave voltage under control of the square wave voltage output of generator 16, and supplies such voltage to transmission system **19*a*. Due to the impedance match between coupling circuit 5 and transmission system 19*a*, the square wave voltage repeated by coupling circuit 5 is supplied to the input of transmission system 19*a* with substantially maximum power, uniform time duration, and minimum reflection. The relative time durations of the positive-going and negative-going portions of the square wave voltage received at the output end of transmission system 19*a* are measured by a time-bias detector 40**.

These relative measurements provide an indication of the fidelity of transmission system **19*a* for transmitting data information thereover. The maximum-power and minimum-reflection characteristics of the square wave test voltage applied to the input of transmission system 19*a* tend to preserve the optimum time durations of positive-going and negative-going portions as repeated by coupling circuit 5 thereby enabling accurate measurements of the bias of transmission system 19*a* with regard to the respective portions. Bias detector 40** may be of a type disclosed in the copending W. R. Young, Jr., Serial No. 701,223, filed December 6, 1957, which is also assigned to the assignee of the instant application.

Although the invention is described above in connection with a particular embodiment, it is to be understood that other embodiments may be devised by those skilled in the art without departing from the spirit and scope of the invention.

What is claimed is:

1. Means for coupling the output of a pulse source of variable output impedance to the input of a load circuit of a fixed input impedance, said coupling means comprising a first electronic switch circuit and a second electronic switch circuit connected in parallel with one another between the input terminals of said load circuit, said switch circuits having substantially equal switch-closed circuit impedances which are each substantially equal to said fixed input impedance, means for interconnecting said switch circuits for operation in opposition whereby the closing of either of said switch circuits biases the other switch open, and means for applying the output of said pulse source to said first switch circuit for alternately biasing said first switch circuit open and closed in response to pulses in the output of said pulse source.

2. The coupling means in accordance with claim 1 in which each of said switch circuits includes a switching device, and one of said switch circuits includes means responsive to the closing of said one switch circuit for applying a voltage to said load circuit.

3. Means for coupling the output of a pulse source of variable output impedance to the input of a load circuit of fixed input impedance, said coupling means comprising a first electronic switch circuit and a second electronic switch circuit connected in parallel with one another between the input terminals of said load circuit, said switch circuits having substantially equal switch-closed circuit impedances which are substantially equal to said fixed input impedance, each of said switch circuits including a different transistor having a base electrode, an emitter electrode, and a collector electrode, said emitter and collector electrodes being connected in series in their respective switch circuits, means applying the output of said pulse source to the base electrode of the transistor in said first switch circuit for alternately biasing said first switch circuit open and closed in response to pulses from said pulse source, means intercoupling said switch circuits for operation in opposition whereby the closing of either of said switch circuits biases the other switch circuit open, and the last-mentioned means comprising a connection between said first switch circuit and the base electrode of the transistor in said second switch circuit.

4. The coupling means in accordance with claim 3 in which one of said switch circuits includes a source of potential for applying a voltage to said load circuit in response to the closing of said one switch circuit.

5. An On/Off circuit having a substantially constant output impedance comprising a first and second transistors each having base, collector, and emitter electrodes, a source of direct current potential connected between the emitter electrode of said first transistor and the collector electrode of said second transistor, a first resistor connected between the collector electrode of said first transistor and the emitter electrode of said second transistor, a source of pulses of sufficient amplitude to drive said first transistor alternately between a nonconducting condition and a saturation conduction condition, means for applying pulses in the output wave of said pulse source between the base and emitter electrodes of said first transistor, means for biasing said second transistor into an unsaturated conduction condition in response to said nonconducting condition and into a nonconducting condition in response to said saturation conduction condition, and a load connected in series with said potential source between said emitter and collector electrodes of said second transistor, said first resistor having a resistance magnitude substantially equal to the resistance of said direct current source plus the internal impedance between said second transistor emitter and collector electrodes when said second transistor is in its unsaturated conduction condition.

6. The combination in accordance with claim 5 wherein said biasing means comprises means for connecting the base of said second transistor to the junction of said resistor and the collector of said first transistor.

7. The combination in accordance with claim 5 and a second resistor, large in magnitude compared to said first-named resistor, connectod in series with said load.

8. The combination in accordance with claim 5 and an adjustable resistor connected between said first transistor collector and emitter electrodes for controlling the operating level of said circuit.

9. A transistor control circuit having substantially constant output impedance comprising first and second transistors each having a base electrode, an emitter electrode, and a collector electrode, an output circuit, a source of operating potential connected between said first transistor emitter and collector electrodes, a source of pulses of sufficient amplitude to drive said first transistor between a cut-off conduction condition and a saturation conduction condition, a resistor connected between said first transistor collector electrode and one terminal of said output circuit, means for connecting said first transistor emitter electrode to another terminal of said output circuit, means for applying a pulse from said pulse source between said first transistor base and emitter electrodes to bias said first transistor into saturated conduction for connecting said resistor in an electrically conductive circuit including said first transistor between the terminals of said output circuit, and means for connecting said second transistor in an emitter follower circuit comprising, means for connecting said second transistor emitter electrode to said one output terminal, means for connecting said potential source between said second transistor collector electrode and said another terminal, and means for connecting said resistor between said second transistor emitter and base electrodes for biasing said second transistor between a conduction condition and a cut-off condition in response to said first transistor cut-off and saturated conduction conditions, respectively, said second transistor in its conduction condition connecting said potential source in an electrically conductive circuit therewith between the terminals of said output circuit, said resistor having a resistance magnitude substantially equal to the combined resistances of said potential source and of said second transistor between its collector and emitter electrodes in its conduction condition.

10. A transistor circuit for coupling alternate positive-going and negative-going pulses in the output of a multivibrator to a transmission system while presenting to the transmission system substantially constant output impedance, said circuit comprising first and second transistors each having base, emitter, and collector electrodes, means for applying said pulses between said first transistor base and emitter electrodes for driving said first transistor between a cut-off conduction condition and a saturation conduction condition, a variable resistance connected between said first transistor emitter and collector electrodes for adjusting the magnitude of pulses coupled to said transmission system, a source of direct current potential for supplying operating potentials to both of said transistors, means for connecting said source between said first transistor emitter and collector electrodes, a low impedance metallic connection between said first transistor collector electrode and said second transistor base electrode, a first resistor connected between said second transistor emitter electrode and said metallic connection for biasing said second transistor into a conduction condition in response to said cut-off conduction condition and into a cut-off conduction condition in response to said saturation conduction condition, said first resistor having a resistance of substantially the same magnitude as the combined resistances of said source and of said second transistor in its conduction condition between its emitter and collector electrodes, a second resistor having a magnitude substantially larger than said first resistor, and means including said second resistor and said transmission system for connecting said source between said second transistor collector and emitter electrodes.

11. In a circuit including a generator of square wave alternating voltage providing different output impedances for voltage portions of different polarities, and a load having a fixed input impedance, means for translating the different output impedances of said generator into an impedance which is substantially equal to the fixed input impedance of said load to transfer the square wave voltage of said generator to the input of said load with substantially minimum reflection, said translating means comprising two transistors, each including a base, a collector, and an emitter, said base and emitter of one transistor being connected to the output of said generator whereby said one transistor is biased On in response to voltage portions of one polarity and biased Off in response to voltage portions of opposite polarity, a resistor having one end connected to the collector of said one transistor and the base of the other of said two transistors, said resistor having its opposite end connected to said emitter of said other transistor and one input terminal of said load, a source of direct current potential having one terminal connected to said collector of said other transistor and the opposite terminal connected to said emitter of said one transistor and a second input terminal of said load, and means for connecting said source to said collector of said one transistor and said base of said other transistor and thereby to said one end of said resistor, the last-mentioned means applying a bias potential to to the last-mentioned collector and base, said one transistor when biased On providing a low impedance path to divert the current of said source therethrough and away from said load, said one transistor also causing said other transistor to be biased Off, said one transistor when biased Off providing such a high impedance as to preclude the flow of current of said source therethrough and thereby to establish another path including said source, load, resistor, and a portion of said connecting means for diverting the flow of current of said source therethrough, the last-mentioned current flow developing across said resistor a voltage which biases said other transistor On to provide a low impedance path therethrough to continue the flow of current of said source through said load, said load input impedance seeing a substantially constant impedance comprising said resistor in series with the internal collector-emitter impedance of said one transistor when the latter transistor is biased On or comprising said source in series with the internal collector-emitter impedance of said other transistor when said other transistor is biased On.

12. The circuit according to claim 11 in which said connecting means includes a voltage divider connected across said source and having an intermediate point connected to said collector of said one transistor and said base of said other transistor for applying biasing potential thereto.

13. The circuit according to claim 12 in which said voltage divider includes an adjustable resistor connected between a terminal common to said source and load and a terminal common to said collector of said one transistor and said base of said other transistor for varying the magnitude of the biasing potential applied to said base of said other transistor when said other transistor is On and said one transistor is Off thereby varying the magnitude of the direct curent supplied by said source to said load.

14. The circuit according to claim 13 in which said voltage divider includes a fixed resistor connected between said base and said collector of said other transistor.

15. The circuit according to claim 11 which includes a resistor connected between said emitter of said other transistor and said one terminal of said load for adjusting the impedance of said input thereof.

References Cited in the file of this patent

UNITED STATES PATENTS

| | | |
|---|---|---|
| 2,583,146 | Jacob | Jan. 22, 1952 |
| 2,599,675 | Volz | June 10, 1952 |
| 2,767,364 | Guggi | Oct. 16, 1956 |
| 2,812,474 | Henle | Nov. 5, 1957 |
| 2,825,821 | Logue | Mar. 4, 1958 |
| 2,842,683 | Clapper | July 8, 1958 |

FOREIGN PATENTS

| | | |
|---|---|---|
| 759,566 | Great Britain | Oct. 17, 1956 |

OTHER REFERENCES

Rockett: "Impedance Meas. With Square Waves," Electronics, September 1944, pp. 138.

Mundy: "Transistors as Switching Devices," AT & E Journal, vol. 12, No. 3, pp. 173–181.